US006581659B1

(12) United States Patent
Zanzig et al.

(10) Patent No.: US 6,581,659 B1
(45) Date of Patent: Jun. 24, 2003

(54) TIRE WITH SILICA-REINFORCED TREAD COMPRISED OF TRANS 1,4-POLYBUTADIENE, SOLUTION, SBR POLYISOPRENE AND DEFINED AMOUNT OF CARBON BLACK AND AMORPHOUS SILICA

(75) Inventors: David John Zanzig, Uniontown, OH (US); Paul Harry Sandstrom, Tallmadge, OH (US); John Joseph Andre Verthe, Kent, OH (US); Edward John Blok, Wadsworth, OH (US); Gregory Martin Holtzapple, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/416,179

(22) Filed: Oct. 11, 1999

(51) Int. Cl.[7] .............................. B60C 1/00; B60C 11/00
(52) U.S. Cl. ..................................... 152/209.5; 152/905
(58) Field of Search ............................ 152/209.5, 905; 524/492, 493; 525/236, 237

(56) References Cited

U.S. PATENT DOCUMENTS

| 3,768,537 A | * | 10/1973 | Hess et al. ................ 152/209.5 |
| 4,510,291 A | | 4/1985 | Kawakami ................... 525/237 |
| 5,025,059 A | | 6/1991 | Mouri et al. ................. 524/495 |
| 5,174,838 A | | 12/1992 | Sandstrom et al. ...... 152/209 R |
| 5,229,195 A | | 7/1993 | Maruoka et al. ............. 428/220 |
| 5,229,459 A | | 7/1993 | Sandstrom et al. .......... 525/136 |
| 5,386,865 A | | 2/1995 | Sandstrom et al. .......... 152/525 |
| 5,393,821 A | * | 2/1995 | Shieh et al. ................. 524/492 |
| 5,397,616 A | * | 3/1995 | Aoki ........................ 152/209.5 |
| 5,626,697 A | | 5/1997 | Sandstrom et al. .......... 152/525 |
| 5,739,198 A | * | 4/1998 | Sandstrom et al. .......... 524/493 |
| 5,753,761 A | * | 5/1998 | Sandstrom et al. .......... 525/236 |
| 5,885,389 A | | 3/1999 | Sandstrom et al. .......... 152/543 |
| 6,046,266 A | * | 4/2000 | Sandstrom et al. .......... 524/492 |

FOREIGN PATENT DOCUMENTS

| EP | 0505904 | | 9/1992 |
| EP | 0738614 | | 10/1996 |
| EP | 0829380 | | 3/1998 |
| JP | 60133036 | | 7/1985 |
| JP | 60143453 | | 7/1985 |
| JP | 62101504 | | 5/1987 |
| JP | 2-18431 | * | 1/1990 ................. 152/905 |

OTHER PUBLICATIONS

European Search Report.

* cited by examiner

Primary Examiner—Steven D. Maki
(74) Attorney, Agent, or Firm—Henry C. Young, Jr.

(57) ABSTRACT

This invention relates to a tire having a tread of a cap/base construction wherein the tread cap is composed of trans 1,4-polybutadiene, solution polymerization prepared styrene/butadiene copolymer rubber, cis 1,4-polyisoprene rubber and defined amounts of carbon black and amorphous silica reinforcement.

2 Claims, No Drawings

TIRE WITH SILICA-REINFORCED TREAD COMPRISED OF TRANS 1,4-POLYBUTADIENE, SOLUTION, SBR POLYISOPRENE AND DEFINED AMOUNT OF CARBON BLACK AND AMORPHOUS SILICA

FIELD

This invention relates to a tire having a tread of a cap/base construction wherein the tread cap is composed of trans 1,4-polybutadiene, solution polymerization prepared styrene/butadiene copolymer rubber, cis 1,4-polyisoprene and defined amounts of carbon black and amorphous silica reinforcement.

BACKGROUND

Tires are often prepared with a tread of a cap/base construction where the outer tread cap is designed to be road contacting and the underlying base is designed to support the tread cap and is not designed to be road contacting.

For various purposes, it is sometimes desired to provide a tire tread cap with a rubber composition which has a relatively high degree of durability and which has good, relatively low, rolling resistance, good, relatively high, traction and good, relatively low, treadwear.

For such purposes, it is believed to be rather commonplace to often use cis 1,4-polybutadiene rubber in a tread cap rubber composition to enhance its treadwear.

It is also sometimes desirable to provide a tire tread cap rubber composition with various amounts of amorphous silica reinforcement and carbon black for various purposes.

In particular, where it is desired to provide a tire tread cap with enhanced balance of traction and treadwear properties, cis 1,4-polybutadiene rubber and silica reinforcement may be included in its formulation.

However, for various purposes, it is also sometimes desired to provide a tire tread cap with an enhanced durability in a sense of resistance to tear initiation and propagation, particularly where a tire might be used in off-the-road service conditions environment, yet still have an enhanced balance of traction and treadwear.

Historically, trans 1,4-polybutadiene have been used in various tire components, including a tire sidewall (U.S. Pat. Nos. 5,626,697 and 5,386,865), a tire tread base of a cap/base construction (U.S. Pat. No. 5,229,195) as well as a tread with a portion intended to be road contacting as Japanese publications 60-133; 60-101,504; and 60-143,453 and U.S. Pat. Nos. 4,510,291 and 5,025,059. Also, see U.S. Pat. Nos. 5,174,838, 5,386,865, 5,229,459 and 5,885,389.

It is important to appreciate that trans 1,4-polybutadiene may be similar to a thermoplastic polymer which becomes elastomeric upon being sulfur vulcanized. As an elastomer, trans 1,4-polybutadiene, unlike most elastomers, may tend to strain crystallize under low strain (low elongation) conditions so that it, therefore, may provide modulus strength enhancement during the dynamic operation of a tire tread. This phenomenon may provide improved tear resistance, particularly resistance to irregular wear of a tire tread's road-contacting surface under service conditions.

A preparation of a trans 1,4-polybutadiene resin and its characterization may readily be found in U.S. Pat. No. 5,089,574.

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

The term "phr" if used herein, and according to conventional practice, refers to "parts of a respective material per 100 parts by weight of rubber, or elastomer" which in this invention is intended to include the aforesaid trans 1,4-polybutadiene resin.

A reference to an elastomer's Tg refers to a "glass transition temperature" which can conveniently be determined by a differential-scanning calorimeter at a heating rate of 10° C. per minute.

SUMMARY AND PRACTICE OF THE INVENTION

In accordance with this invention, a tire is provided having a tread of a cap/base construction, where the tread cap is intended to be ground-contacting rubber; wherein the tread cap is of a rubber composition which comprises, based on 100 parts by weight (phr) of rubber (A) 100 phr of rubber comprising, and preferably consisting essentially of, (1) about 5 to about 50, alternatively, about 10 to about 30, phr of trans 1,4-polybutadiene polymer having a trans 1,4 content in a range of about 80 to about 90 percent, (2) about 30 to about 70, alternatively, about 40 to about 60, phr of organic solution polymerization prepared styrene/butadiene copolymer rubber containing about 5 to about 40, alternatively about 5 to about 15, weight percent units styrene, and (3) about 5 to about 50, alternatively about 20 to about 40, phr of cis 1,4-polyisoprene rubber (B) about 40 to about 95 phr reinforcing filler as carbon black and amorphous silica; wherein said filler contains (i)about 35 to about 75 phr of carbon black and about 5 to about 20 phr of said amorphous silica or (ii) about 5 to about 30 phr of carbon black and about 35 to about 90 phr of said amorphous silica and (C) at least one silica coupling agent having a moiety reactive with hydroxyl (e.g. silanol groups) on the surface of the said silica and an additional moiety interactive with the said elastomer(s).

A significant aspect of this invention is the utilization of the trans 1,4-polybutadiene to replace a significant portion of commonly used cis 1,4-polyisoprene rubber in the tire tread rubber composition in a circumstance where the tire tread rubber contains defined amounts of amorphous silica reinforcement where, insofar as the carbon black and silica are concerned, (i) silica is in a minority or (ii) silica is in the majority.

In one aspect, it may be desired for the silica to be in a minority insofar as the carbon black and silica reinforcement is concerned in order to maximize wear resistance of the tread rubber composition.

In another aspect, it may be desired for the silica to be in a majority insofar as the carbon black and silica reinforcement is concerned in order to maximize a reduction of rolling resistance for the tire itself.

For the replacement of a portion of the otherwise used cis 1,4-polyisoprene rubber in the tread cap rubber composition, it is considered herein that the trans 1,4-polybutadiene has a particular advantage in that, for example, it tends to strain crystallize under low strain (low elongation such as, for example, about 5 to 20 percent elongation) conditions in a cured rubber conditions in contrast to the more commonly used cis 1,4-polyisoprene which would be expected to tend to strain crystallize at somewhat higher such low strains, or elongations, of about 25 percent or higher. This is important where low strain stiffness for a rubber composition is desired such as, for example, in tire tread for treadwear resistance and handling.

Accordingly, this phenomenon may provide improved tread wear and tire handling properties for a tread rubber which contains a trans 1,4-polybutadiene polymer.

The inclusion of the trans 1,4-polybutadiene in the tire tread cap rubber composition is, therefore, considered herein to be of a significant benefit, as compared to a more commonly used cis 1,4-polyisoprene rubber in that the trans 1,4-polybutadiene structure is observed to improve resistance to abrasion, or wear, promotes higher rebound values with predictive lower rolling resistance for a tire with tread of such rubber composition, for the rubber composition.

Another significant aspect of this invention is the use of a solution polymerization derived styrene/butadiene copolymer elastomer (S-SBR) in combination with the trans 1,4-polybutadiene. This is considered herein to be significant because the presence of the S-SBR in the rubber composition considered herein to promote a reduction in rolling resistance and increase in traction and handling for a tire having a tread of such rubber composition.

The use of a relatively low to conventional styrene content in a range of about 5 to about 15 weight percent in the S-SBR is considered as being significant because a relatively low styrene content for the S-SBR is considered herein to promote a reduction in rolling resistance for a tire having a tread of such rubber composition.

The use of a relatively high styrene content in a range of about 25 to about 40 weight percent in the S-SBR is considered as being significant because a relatively high styrene content for the S-SBR is considered herein to promote traction for a tire having a tread of such rubber composition.

In practice, the relatively minor amount of cis 1,4-polyisoprene used is preferably natural rubber.

In general, the amorphous silica is typically selected from precipitated silica and precipitated aluminosilicate having a BET surface area within a range of about 100 to about 300 m$^2$/g and a DBP value within a range of about 100 to about 350, preferably about 150 to about 300 m$^2$/g.

The trans 1,4-polybutadiene polymer which has a Tg in a range of about −70° C. to about −80° C. is considered herein to be significant and beneficial for the tire tread cap to promote improved resistance to treadwear without a loss of traction whereas use of a cis 1,4-polybutadiene rubber in the rubber composition having a Tg of about −100° C. to −105° C. would be expected to promote a comparative loss of traction for a tire tread of the rubber composition. Such phenomenon of use of cis 1,4-polybutadiene rubber in a tire tread rubber composition is believed to be well known to those having skill in such art.

The amorphous silica to be used as reinforcement in the tread cap of this invention is preferably a precipitated silica, as hereinbefore pointed out, and is intended to include aluminosilicates. Such precipitated silica may be prepared, for example, by controlled acidification of a soluble silicate, e.g., sodium silicate.

A BET method of measuring surface area is described in the *Journal of the American Chemical Society*, volume 60, page 304 (1930).

Various commercially-available silicas may be considered for use in the tread of this invention, particularly the tread cap such as, for example only and without limitation, silica commercially available from Rhodia such as, for example, Zeosil 1165MP, silica available from Degussa AG with designations such as, for example, BV3370GR, and silica available from J. M. Huber such as, for example, Zeopol 8745 and silica available from PPG Industries such as, for example, HiSil 210.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silica, and plasticizers, fillers, pigments, fatty acid, zinc oxide, waxes, antioxidants and antiozonants and peptizing agents. As known to those skilled in the art, depending on the intended use of the sulfur-vulcanizable and sulfur-vulcanized material (rubbers), the additives mentioned above are selected and commonly used in conventional amounts.

Typical additions of carbon black, silica and silica coupler for this invention are hereinbefore set forth.

In practice, the said trans 1,4-polybutadiene polymer preferably has a microstructure characterized by having a trans 1,4-content of about 80 to about 90 percent, a vinyl 1,2-content of about 10 to about 15 percent and a cis 1,4-content of about 1 to about 5 percent.

Preferably, the said trans 1,4-polybutadiene polymer is further characterized by having a molecular weight number average (Mn) in a range of about 150,000 to about 210,000.

Such trans 1,4-polybutadiene polymer preferably has a heterogeneity index (HI) in a range of about 2 to about 2.5 which is representative of a relatively narrow heterogeneity index—a ratio of its weight average molecular weight (Mw)—to its number average molecular weight Mn). A narrow heterogeneity index is often desirable for various purposes.

Preferably the said trans 1,4-polybutadiene polymer has a melting point in a range of about 38° C. to about 42° C. as determined by differential scanning calorimeter (DSC) measurement at a heating rate of about 10° C. per minute.

Typically, the said trans 1,4-polybutadiene polymer has a Tg within a range of about −70° C. to about −80° C.

While all aspects of the invention may not be fully understood, it is believed that the aforesaid microstructure of the trans 1,4-polybutadiene polymer contributes substantially to its thermoplastic polymer type of properties, particularly its rather hard and stiff appearance property at temperatures below about 30° C, such as about 20° C. to about 25° C., and its melting point property within a temperature range of about 30° C. to about 50° C.

It is also considered that its characterized number average molecular weight (Mn) range as well as its relatively narrow heterogeneity index may contribute somewhat to its aforesaid resin-like property prior to mixing it with other elastomers.

The forming of a tire component is contemplated to be by conventional means such as, for example, by extrusion of rubber composition to provide a shaped, unvulcanized rubber component such as, for example, a tire tread. Such forming of a tire tread is well known to those having skill in such art.

Accordingly, it is considered herein that a tire tread rubber composition which is quantitatively reinforced with silica and contains the combination of solution SBR and trans 1,4-polybutadiene having its prescribed microstructure is novel and inventive.

It is understood that the tire, as a manufactured article, is prepared by shaping and sulfur curing the assembly of its components at an elevated temperature (e.g. 140° C.–160° C.) and elevated pressure in a suitable mold. Such practice is well known to those having skill in such art.

Thus, in a more specific aspect of this invention, a tire is provided having a tread component, namely an outer, circumferential tread intended to be ground-contacting, comprised of a rubber composition prepared according to this invention.

In practice, while it is preferred the rubber of the composition consists essentially of the trans 1,4-polybutadiene, cis 1,4-polyisoprene and the solution SBR, small amounts of additional diene-based elastomers may be used for special applications, particularly where enhanced tire traction is desired.

Representative of such additional diene-based elastomers are, for example, from 5 up to and including 10 phr, or even 15 phr, of one or more of 3,4-polyisoprene and styrene/isoprene/butadiene terpolymers.

Representative of rubber reinforcing carbon blacks for the tire tread cap rubber composition are those, for example, having an Iodine value (ASTM D1510) in a range of about 80 to about 140, alternatively about 100 to about 150, g/kg together with a DBP (dibutylphthalate) value (ASTM D2414) in a range of about 70 to about 200, alternatively about 100 to about 180 cm$^3$/100 g. Representative of such carbon blacks can easily be found in *The Vanderbilt Rubber Handbook*, 1978 edition, page 417.

In practice, the silica is used in conjunction with a silica coupling agent to couple the silica with the elastomer(s) and, thus, enhance the elastomer reinforcing effect of the silica.

In particular, such coupling agents are sometimes composed of a silane which has a constituent component, or moiety, (the silane portion) capable of reacting with the silica surface, namely silanol groups on the silica surface and, also, a constituent component, or moiety, capable of reacting with the rubber, particularly a sulfur-vulcanizable rubber which contains carbon-to-carbon double bonds, or unsaturation. In this manner, then the coupler acts as a connecting bridge between the silica and the rubber and, thereby, enhances the rubber reinforcement aspect of the silica.

Numerous coupling agents are taught for use in combining silica and rubber such as, for example, silane coupling agents containing a polysulfide component, or structure, such as bis-(3-trialkoxysilylalkyl)polysulfide having an average of from 2.2 to 2.6 or from 3.5 to 4 connecting sulfur atoms in its polysulfidic bridge. Exemplary of such materials is bis-(3-triethoxysilylpropyl)polysulfide.

It is readily understood by those having skill in the art that the rubber composition would be compounded by methods generally known in the rubber compounding art, such as mixing the various sulfur-vulcanizable constituent rubbers with various commonly used additive materials such as, for example, curing aids such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents. As known to those skilled in the art, depending on the intended use of the sulfur vulcanizable and sulfur-vulcanized material (rubbers), the additives mentioned above are selected and commonly used in conventional amounts.

Typical amounts of reinforcing type carbon blacks(s) for this invention are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr. Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur-vulcanizing agent. Examples of suitable sulfur-vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention which is more primarily directed to the preparation of tire treads of a cap/base construction where the tread cap is of a rubber composition which contains a combination of trans 1,4-polybutadiene and SBR and is reinforced with silica and carbon black with silica or carbon black being in the majority.

The mixing of the rubber composition can be accomplished by methods known to those having skill in the rubber mixing art. For example, the ingredients may be mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art.

The invention may be better understood by reference to the following examples in which the parts and percentages are by weight unless otherwise indicated.

EXAMPLE I

In this Example, a first rubber composition comprised of solution SBR and cis 1,4-polyisoprene natural rubber is prepared and referred to herein as "Control Sample A".

Similar rubber compositions are prepared in which a portion of the cis 1,4-polyisoprene rubber is replaced with trans 1,4-polybutadiene rubber and referred to herein as "Samples B–D".

For reinforcement of the rubber Samples, carbon black and amorphous silica are used in which the silica is in a minority, namely, 17 phr of silica, with carbon black in an amount of 43 phr plus about 1.8 phr carbon black contained in the coupling agent composite.

The rubber compositions were prepared in an internal rubber mixer using three separate stages of addition (mixing), namely, two sequential non-productive mix stages (without the sulfur and accelerator curatives) to a temperature of about 150° C. and one final productive mix stage (with sulfur and accelerator curatives) to a temperature of about 115° C.

TABLE 1

|  | Exp A (Control) | Exp B | Exp C | Exp D |
|---|---|---|---|---|
| 1st Non-Productive Ingredients ||||| 
| Trans 1,4-polybutadiene[1] | 0 | 10 | 20 | 30 |
| Solution SBR rubber[2] | 50 | 50 | 50 | 50 |
| Cis 1,4-polyisoprene[3] | 50 | 40 | 30 | 20 |
| Carbon black[4] | 43 | 43 | 43 | 43 |
| Processing oil & waxes[5] | 9 | 9 | 9 | 9 |
| Stearic acid | 2 | 2 | 2 | 2 |
| Zinc oxide | 3 | 3 | 3 | 3 |
| Antidegradants[6] | 3.5 | 3.5 | 3.5 | 3.5 |
| 2nd Non-Productive ||||| 
| Silica[7] | 17 | 17 | 17 | 17 |
| Coupling agent[8] | 3.5 | 3.5 | 3.5 | 3.5 |
| Productive Ingredients ||||| 
| Sulfur | 1.3 | 1.3 | 1.3 | 1.3 |
| Accelerator, sulfenamide and thiuram type | 1.1 | 1.1 | 1.1 | 1.1 |

1. Trans 1,4-polybutadiene elastomer having a Tg of about −75° C. and a melting point of about 40° C.
2. Organic solution polymerization prepared styrene/butadiene copolymer elastomer having a styrene content of about 12 percent and a Tg of about −42° C. as SOLFLEX ® 1216 from The Goodyear Tire & Rubber Company.
3. Natural rubber.
4. N299 carbon black, an ASTM designation.

TABLE 1-continued

|  | Exp A (Control) | Exp B | Exp C | Exp D |
|---|---|---|---|---|

5. Paraffinic rubber processing oil and microcrystalline and paraffinic waxes.
6. Phenylenediamine type.
7. Precipitated silica obtained as HiSil 210 from PPG Industries company.
8. A composite commercially available from Degussa S.A. as X50S in a from of a 50/50 blend of bis-(3-triethoxysilylpropyl) tetrasulfide (said tetrasulfide individually available from Degussa S.A. as Si69), with carbon black and, thus, the tetrasulfide is considered as being 50% of the composite reported in the above Table.

Physical properties of the rubber Samples are shown in the following Table 2 with the Stress-Strain, Rebound, Hardness, DIN abrasion and Tear resistance tests being conducted on vulcanized rubber samples.

TABLE 2

| Sample | Sample A (Control) | Sample B | Sample C | Sample D |
|---|---|---|---|---|
| Rheometer Data (150° C.) ||||| 
| ML (dNm) | 11.1 | 8.9 | 10.3 | 11.5 |
| MH (dNm) | 37.0 | 37.5 | 39.0 | 39.7 |
| T$_{90}$ (minutes) | 11.1 | 12.6 | 14.4 | 16.5 |
| Stress-Strain ||||| 
| Tensile Strength, MPa | 17.2 | 17.8 | 17.9 | 15.3 |
| Elongation @ Break, % | 436 | 464 | 469 | 412 |
| 100% Modulus, MPa | 2.3 | 2.1 | 2.1 | 2.1 |
| 300% Modulus, MPa | 11.8 | 11.3 | 10.9 | 10.8 |
| Rebound ||||| 
| Rebound at 23° C. (%) | 48 | 50 | 51 | 52 |
| Hardness ||||| 
| Shore A Hardness, 23° C. | 58 | 58 | 58 | 60 |
| Shore A Hardness, 100° C. | 55 | 55.5 | 56 | 56 |
| DIN abrasion, volume loss (cm$^3$) | 110 | 102 | 88 | 75 |
| Tear resistance (95° C.) | 91 | 106 | 140 | 117 |

It is readily seen from Table 2 that the addition of the trans 1,4-polybutadiene polymer improved the rebound values and, therefore, the hysteresis of the respective Samples B–D. This is indicative of lower rolling resistance for a tire having a tread of such composition and, therefore, better fuel economy for an associated vehicle.

It can also be seen from Table 2 that the addition of the trans 1,4-polybutadiene polymer improved the abrasion resistance, or resistance to wear, as reflected in Samples B–D.

It can be further be seen from Table 2 that the addition of the trans 1,4-polybutadiene polymer improved the tear resistance as reflected in Samples B–D. This is considered herein to be significant as being indicative of better tire durability for a tire having a tread of such rubber composition.

EXAMPLE II

Tires of size P195/75R14 were prepared with treads of rubber compositions corresponding, respectively, to Samples A–D of Example I where carbon black is the majority of the reinforcing fillers.

Test information for the respective tires is represented in the following Table 3 with values normalized to the a value of 100 assigned to the respective properties of the Control Tire A with tread of Sample A.

TABLE 3

| Sample | Tire A (Control) | Tire B | Tire C | Tire D |
|---|---|---|---|---|
| Rolling resistance | 100 | 105 | 103 | 103 |
| Wet traction | | | | |
| 32 kph, peak/slide | 100/100 | 95/96 | 96/93 | 96/89 |
| 64 kph, peak/slide | 100/100 | 98/97 | 96/93 | 96/89 |
| 96 kph, peak/slide | 100/100 | 99/101 | 95/100 | 93/100 |
| Treadwear[1] | | | | |
| Front tires | 100 | n/a | n/a | 116 |
| Rear tires | 100 | n/a | n/a | 110 |

1. Treadwear measured as average reduction in tread depth as measurements from top to bottom of the tread grooves taken across the width of the tread. A higher value means that less tread was lost and, therefore, represents less wear of the tread which is better.

In the above Table 3, rolling resistance is represented as a relative rating compared to an assigned value of 100 for the control tire. For these reported results, it is important to appreciate that higher value equates to lower resistance to rolling and, therefore, is more desirable.

Accordingly, for this Example, a reported higher rolling resistance value is better as representing a lower resistance to rolling for the respective tire as compared to the Control tire.

In Table 3, wet traction of the tires is measured by braking a vehicular at individual vehicular speeds 32 kph, 64 kph and 96 kph until the vehicle stops for both "peak", which means the peak, or maximum, traction value for the peak portion of the traction measurement, and "slide", which means the sliding distance until the vehicle is stopped for the sliding portion of the tire traction measurement. Accordingly, a higher reported value is better as representing a greater resistance to skidding as compared to the Control tire.

In Table 3 the term "n/a" for treadwear for certain of the tires simply means that the treadwear was not evaluated for the respective tires.

It can readily be seen from Table 3 that the addition of trans 1,4-polybutadiene to the tire tread rubber composition significantly improved the tread wear (reduced the wear of the tread) as well as resistance to rolling which is predictive of better fuel economy for a tire having a tread of such rubber composition.

EXAMPLE III

In this Example, a rubber composition comprised of solution SBR and cis 1,4-polyisoprene natural rubber is prepared and referred to herein as "Control Sample I" as shown in the following Table 4.

Similar rubber compositions are prepared in which a portion of the cis 1,4-polyisoprene rubber is replaced with trans 1,4-polybutadiene rubber and referred to herein as "Samples E–G" as shown in the following Table 5.

For reinforcement of the rubber Samples, carbon black and amorphous silica are used in which the silica is in a majority, namely, 54 phr of silica with only 6 phr carbon black plus 5 phr of carbon black contained in the coupling agent composite.

The rubber compositions were prepared in an internal rubber mixer using three sequential internal rubber mixing stages, namely, two non-productive mix stage (without the sulfur and accelerator curatives) using thermomechanical mixing at a temperature of about 160° C. followed by a one final internal mixing productive mix stage (with sulfur and accelerator curatives) to a temperature of about 110° C.

TABLE 4

| | Sample E (Control) | Sample F | Sample G |
|---|---|---|---|
| Trans 1,4-polybutadiene[1] | 0 | 10 | 20 |
| Solution SBR rubber[2] | 50 | 50 | 50 |
| Natural rubber[3] | 50 | 40 | 30 |
| Amorphous silica[4] | 54 | 54 | 54 |
| Coupling agent composite[5] | 10 | 10 | 10 |
| Processing oil & waxes[6] | 12 | 12 | 12 |
| Stearic acid | 2 | 2 | 2 |
| Zinc oxide | 3.5 | 3.5 | 3.5 |
| Antidegradants[7] | 3.5 | 3.5 | 3.5 |
| Carbon black[8] | 6.0 | 6.0 | 6.0 |
| Productive Mixing | | | |
| Sulfur | 1.6 | 1.6 | 1.6 |
| Accelerator, sulfenamide and thiuram type | 1.3 | 1.3 | 1.3 |

1. Trans 1,4-polybutadiene elastomer having a Tg of about −75° C. from. The Goodyear Tire & Rubber Company.
2. Organic solution polymerization prepared styrene/butadiene copolymer elastomer having a styrene content of about 12 percent and a Tg of about −42° C. as SOLFLEX ® 1216 from The Goodyear Tire & Rubber Company.
3. Cis 1,4-polyisoporene natural rubber.
4. Precipitated silica as HiSil 210 from PPG Industries.
5. A composite commercially available from Degussa S.A. as X50S in a form of a 50/50 blend of bis-(3-triethoxysilylpropyl) tetrasulfide (said tetrasulfide individually available from Degussa S.A. as Si69), with carbon black and, thus, the tetrasulfide is considered as being 50% of the composite reported in the above Table.
6. Paraffinic rubber processing oil and microcrystalline and paraffinic waxes.
7. Phenylenediamine type.
8. N299 carbon black, an ASTM designation.

The Samples of Table 4 were vulcanized (cured) at about 150° C. for about 18 minutes.

The following Table 5 illustrates various physical properties of the cured Samples.

TABLE 5

| Sample | Sample E (Control) | Sample F | Sample G |
|---|---|---|---|
| Rheometer (150° C.) | | | |
| ML (dNm) | 7.2 | 9.3 | 9.8 |
| MH (dNm) | 37.4 | 38.7 | 38.4 |
| T$_{90}$ (mins.) | 11.5 | 14.3 | 15.8 |
| Stress-Strain | | | |
| Tensile Strength, MPa | 18.0 | 17.4 | 16.7 |
| Elongation @ Break, % | 410 | 422 | 438 |
| 100% Modulus, MPa | 2.2 | 2.1 | 1.9 |
| 300% Modulus, MPa | 13.2 | 12.1 | 10.9 |
| Rebound | | | |
| Rebound at 23° C. (%) | 59.0 | 58.0 | 58.5 |
| Hardness | | | |

TABLE 5-continued

| Sample | Sample E (Control) | Sample F | Sample G |
| --- | --- | --- | --- |
| Shore A Hardness, 23° C. | 54 | 56 | 55 |
| Shore A Hardness, 100° C. | 54 | 55 | 55 |
| DIN Abrasion, volume loss (cm$^3$), at 10N | 121 | 104 | 94 |
| Tear resistance (95° C.) | 57 | 70 | 98 |

It is readily seen from Table 5 that the addition of the trans 1,4-polybutadiene polymer improves the abrasion resistance of the rubber compositions represented as Samples F and G, as compared to Control Sample E.

This is considered herein to be significant because an increase in abrasion resistance for a rubber composition is often an indicator of improved tire tread wear of the rubber composition and longer tire life.

It is also readily seen from Table 5 that the addition of the trans 1,4-polybutadiene polymer improved the tear resistance of the cured rubber composition as evidenced by the higher tear resistance of Samples F and G as compared to Control Sample E.

This is considered herein to be beneficial because increased tear resistance is indicative of better tire durability.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a tread of a cap/base construction; wherein said tread cap is of a rubber composition wherein said rubber composition is prepared by a process which comprises, based upon parts by weight per 100 parts by weight rubber (phr); blending rubbers consisting essentially of about 10 to about 30 phr of trans 1,4-polybutadiene rubber having a trans 1,4-content in a range of about 80 to about 90 percent, about 40 to about 60 phr of solution polymerization prepared styrene/butadiene rubber and about 20 to about 40 phr of natural cis 1,4-polyisoprene rubber, together with about 40 to about 95 phr of reinforcing filler consisting of about 5 to about 30 phr of carbon black and about 35 to about 90 phr of amorphous precipitated silica; together with a silica coupler having a moiety reactive with hydroxyl groups contained on said precipitated silica and another moiety interactive with said rubber(s), in an internal rubber mixer, wherein said rubbers are blended in the presence of said reinforcing filler and exclusive of pre-blending said rubbers in the absence of said reinforcing fillers;

wherein said trans 1,4-polybutadiene has a Tg in a range of about −70° C. to about −80° C., a molecular weight (Mn) in a range of about 150,000 to about 210,000, a heterogeneity index in a range of about 2 to about 2.5 and a microstructure comprised of a trans 1,4-content of about 80 to 90 percent, a vinyl 1,2-content of about 10 to 15 percent and a cis 1,4-content of about 1 to 5 percent;

wherein content of units derived from styrene of said solution SBR is in a range of from about 25 to about 40 weight percent, and wherein said silica coupling agent is a bis(3-trialkoxysilylalkyl)polysulfide having an average of from 2.2 to 2.6 connecting sulfur atoms in its polysulfidic bridge.

2. The tire of claim 1 wherein said coupling agent is a bis(3-triethoxysilylpropyl)polysulfide.

* * * * *